(12) United States Patent
Lin et al.

(10) Patent No.: US 10,542,211 B2
(45) Date of Patent: Jan. 21, 2020

(54) CAMERA SUBSYSTEM EVALUATION USING SENSOR REPORT INTEGRATION

(71) Applicant: GM Global Technology Operations LLC, Detroit, MI (US)

(72) Inventors: Wen-Chiao Lin, Rochester Hills, MI (US); Shengbing Jiang, Rochester Hills, MI (US); Jinsong Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 239 days.

(21) Appl. No.: 15/725,947

(22) Filed: Oct. 5, 2017

(65) Prior Publication Data
US 2019/0109988 A1   Apr. 11, 2019

(51) Int. Cl.
| | |
|---|---|
| *H04N 5/232* | (2006.01) |
| *G06T 7/33* | (2017.01) |
| *G06K 9/00* | (2006.01) |
| *G06T 7/80* | (2017.01) |

(52) U.S. Cl.
CPC ..... *H04N 5/23238* (2013.01); *G06K 9/00791* (2013.01); *G06T 7/33* (2017.01); *B60R 2300/105* (2013.01); *G06T 7/85* (2017.01); *G06T 2207/30252* (2013.01)

(58) Field of Classification Search
CPC ... H04N 5/23238; G06K 9/00791; G06T 7/33
See application file for complete search history.

(56) References Cited

U.S. PATENT DOCUMENTS

| | | | | |
|---|---|---|---|---|
| 6,546,294 | B1* | 4/2003 | Kelsey | G05B 23/0283 |
| | | | | 348/231.3 |
| 6,675,006 | B1* | 1/2004 | Diaz | B60R 25/1004 |
| | | | | 455/404.1 |
| 2007/0088473 | A1* | 4/2007 | Moon | G07C 5/008 |
| | | | | 701/36 |
| 2014/0071281 | A1* | 3/2014 | Wu | H04N 17/002 |
| | | | | 348/148 |
| 2014/0085409 | A1 | 3/2014 | Zhang et al. | |
| 2018/0342113 | A1* | 11/2018 | Kislovskiy | G08G 1/09623 |

* cited by examiner

*Primary Examiner* — Zhubing Ren
(74) *Attorney, Agent, or Firm* — Quinn IP Law (57) ABSTRACT

A method is used to evaluate a camera-related subsystem in a digital network, e.g., aboard a vehicle or fleet, by receiving, via a camera diagnostic module (CDM), sensor reports from the subsystem and possibly from a door sensor, rain/weather sensor, or other sensor. The CDM includes data tables corresponding to subsystem-specific fault modes. The method includes evaluating performance of the camera-related subsystem by comparing potential fault indicators in the received sensor reports to one of the data tables, and determining a pattern of fault indicators in the reports. The pattern is indicative of a health characteristic of the camera-related subsystem. A control action is executed with respect to the digital network in response to the health characteristic, including recording a diagnostic or prognostic code indicative of the health characteristic. The digital network and vehicle are also disclosed.

11 Claims, 5 Drawing Sheets

| Type | Information | Processor/Memory Indicators | Label |
|---|---|---|---|
| Processor Conditions | Processor Temperature | Normal Range | A |
| | Processor Voltage | Normal Range | B |
| Processor Execution | # of Software Resets | Exceed Threshold Number | C |
| | # of Stack Overflows | Exceed Threshold Number | D |
| | # of Software Hang-Up | Exceed Threshold Number | E |

Fig-4A

| Type | Information | Image Sensor SOC Indicators | Label |
|---|---|---|---|
| Weather | Lighting | Higher than Normal (Exceed High Threshold) or Lower than Normal (Below Low Threshold) | A |
| SOC Conditions | SOC Temperature | Normal Range | B |
| | SOC Voltage | Normal Range | C |
| Image Processing (Processor) | Histogram | Percentage of Bright Pixels or Dark Pixels Exceed Threshold | D |

*Fig-4B*

| Type | Information | Lens Indicators | Label |
|---|---|---|---|
| Weather | Rain | Indicates Raining | A |
| | Snow | Indicates Snowing | B |
| | Humidity | Indicates Humidity High | C |
| On-Line Algorithms (Processor) | Image Sharpness | Indicates Image Blurry | D |
| | Lens Dirty | Indicates Lens Dirty | E |
| | Droplet | Indicates Rain Droplet | F |
| | Calibration | Indicates Calibration Off | G |

*Fig-4C*

| Type | Information | Communication Indicators | Label |
|---|---|---|---|
| Driver Actions | Door Open | Bad Images and Dropped Images Occur while Door Open | A |
| On-Line Algorithms (Processor) | Bad Images | Frequency of Bad Images Exceed Threshold | B |
| | Dropped Images | Frames per Second Dropped Below Threshold for Some Time Period | C |

Fig-6

US 10,542,211 B2

CAMERA SUBSYSTEM EVALUATION USING SENSOR REPORT INTEGRATION

INTRODUCTION

Digital cameras are used in a variety of systems. For instance, commercial buildings, schools, construction sites, and other facilities use electro-optical and infrared security cameras for daytime and nighttime premises monitoring. Traffic cameras arranged at strategic positions along highways, bridges, and waterways are used to monitor real-time traffic conditions. Similarly, motor vehicles frequently include external cameras that facilitate execution of routine driving maneuvers, such as via vision-based lane detection and obstacle avoidance, as well as by improving an operator's or autonomous controller's overall awareness of the immediate operating environment. Cameras may also be used to evaluate an operator's level of attentiveness to the roadway.

SUMMARY

Disclosed herein are methods and systems for evaluating the performance of a camera-related subsystem in a digital network, i.e., a communications network having one or more connected digital cameras. While operator-driven and autonomously-driven vehicle embodiments are described herein, vehicular applications are just one possible implementation, as will be appreciated by one of ordinary skill in the art in view of the disclosure. Some embodiments provide for diagnosis of a faulty camera/camera-related subsystem, while other embodiments provide a forward-looking prognosis of the digital network and the connected camera(s), e.g., by estimating a remaining useful life and/or state of health of a given camera.

The method takes advantage of available sensor data over a communications bus, e.g., a low-voltage control area network (CAN) bus or another low-voltage differential system (LVDS) in the example vehicle application, and performs diagnosis/prognosis of the camera at the subsystem level. A given camera may rely on multiple internal and external subsystems to function in the networked environment, with the camera-related subsystems being part of the camera or connected to the camera depending on the function. Example camera-related subsystems may include the internal hardware and image processing software of the digital camera itself, as well as the communications bus and processing hardware that ultimately communicates the collected pixel images to a display screen or other device. The method also relies on availability of programmed data tables corresponding to certain subsystem-level faults and information in the form of fault indicators contained in sensor reports from various camera, network, processing, or other camera-related subsystems, possibly including external data such as weather-related data and other internal data such as the open/closed status of a door in an example vehicle embodiment.

As part of the disclosed approach, a programmable computer device referred to as a camera diagnostic module (CDM) is programmed with the above-noted data tables, which in turn indicate relationships between certain types of faults and corresponding fault indicators (i.e., patterns or values of particular sensor output values or data) as contained in the various sensor reports. Some embodiments of the CDM enable isolation of specific types of faults, such as by exposing a faulty camera to calibrated images, collecting pixel images of the calibrated images via the digital camera, and thereafter evaluating a magnitude of divergence or variance of the camera's performance from an expected performance. Optionally, a camera degradation model may be trained using historical data from a single vehicle or a fleet of such vehicles to ultimately determine a health characteristic in the form of, e.g., a state of health and/or remaining useful life of the faulty camera(s).

In various embodiments, the CDM may be implemented onboard a vehicle or offboard, e.g., using telematics to gather the required data. The CDM may be used to provide diagnosis and/or prognosis of a single digital camera or multiple such cameras, possibly from different vehicles.

For a group of systems using the digital network, such as a fleet of driven or autonomous vehicles each having a similarly configured suite of cameras, the CDM may use histograms to identify outlying or abnormally performing cameras in the fleet and thereby detect a particular type of fault. In terms of forward-looking prognosis, a time history of a given indicator, e.g., state of health, may be generated and used to train the camera degradation model as to an expected aging trajectory. Such a model may be generated offboard or onboard depending on available computing resources.

In a particular example embodiment, a method for evaluating performance of a camera-related subsystem of a digital camera within a digital network includes receiving, via the CDM, a set of sensor reports from sensors or subsystems within the digital network. The CDM has memory on which is recorded data tables corresponding to subsystem-specific fault modes. The method includes evaluating the performance of a predetermined camera-related subsystem from among multiple camera-related subsystems, including comparing potential fault indicators in the received sensor reports to a corresponding one of the data tables and determining a pattern of the indicators in the sensor reports that is indicative of a health characteristic of the predetermined camera-related subsystem, i.e., a diagnostic pass/fail and/or forward-looking prognostic health evaluation.

Additionally, the method includes executing a control action with respect to the digital network in response to the health characteristic, including generating recording a code via the CDM that is indicative of the health characteristic.

The digital network may include a plurality of the digital cameras each having, as a corresponding one the camera-related subsystems, a lens, an image sensor system-on-chip (SOC), a communication bus, and processing hardware. Other subsystems such as an image sensor may be part of the camera. Receiving the sensor reports may include receiving the corresponding sensor report from each of the camera-related subsystems for each of the digital cameras.

The digital network may be used onboard a vehicle having a door, in which case receiving the sensor reports may include receiving a door open/closed state and a rain/moisture value from a door position sensor and a weather sensor, respectively.

The vehicle may include front and rear ends, and the digital cameras may include at least a forward-looking camera and a backup camera connected to the respective front and rear ends.

The health characteristic may be a diagnostic pass/fail result or a remaining useful life of the predetermined camera-related subsystem, as noted above. The method may include collecting the potential fault indicators via the CDM while capturing pixel images of calibrated images using the digital camera having the diagnosed faulty camera-related subsystem, comparing the potential fault indicators to calibrated values for a calibrated/new digital camera, and isolating the faulty subsystem based on a variance between the potential fault indicators and the calibrated values.

Executing a control action may include determining, as the above-noted health characteristic, a remaining useful life of the digital camera using a camera degradation model, as well as transmitting a message containing the remaining useful life to an owner or operator of the digital network as part of the control action. Determining the remaining useful life may include processing a modular transfer function value or a numeric state of health through the camera degradation model.

The CDM may be used aboard a vehicle as part of a fleet of vehicles each having a corresponding plurality of the digital cameras. The method may include training the camera degradation model using historical data from all of the digital cameras in the fleet of vehicles. Or, the CDM may be part of a single vehicle having the digital camera, with the method including training the camera degradation model using historical data from the digital camera of the single vehicle. The CDM may be remotely located with respect to the digital network, with the method including transmitting the integrated sensor reports to the CDM using a telematics unit.

An embodiment of the digital network is also disclosed, with the digital network including a plurality of the digital cameras and the CDM as described above. Each camera in this embodiment has a plurality of camera-related subsystems, possibly including the lens, image sensor SOC, communications bus, and processing hardware. Other subsystems may be contemplated within the scope of the disclosure, e.g., an image sensor.

A vehicle includes a body having front and rear ends, a digital network, and the CDM. The cameras, which are mounted to the front and rear ends of the body, each has the lens, image sensor SOC, communications bus, and processing hardware noted above. The CDM evaluates a predetermined one of the camera-related subsystems using the disclosed method.

The above-noted and other features and advantages of the present disclosure will be readily apparent from the following detailed description of the embodiment(s) and best mode(s) for carrying out the described disclosure when taken in connection with the accompanying drawings and appended claims.

The present disclosure is susceptible to various modifications and alternative forms, and some representative embodiments have been shown by way of example in the drawings and will be described in detail herein. Novel aspects of this disclosure are not limited to the particular forms illustrated in the drawings. Rather, the disclosure is intended to cover modifications, equivalents, combinations, or alternatives falling within the spirit and scope of the disclosure as defined by the appended claims.

DETAILED DESCRIPTION

Figure 1:
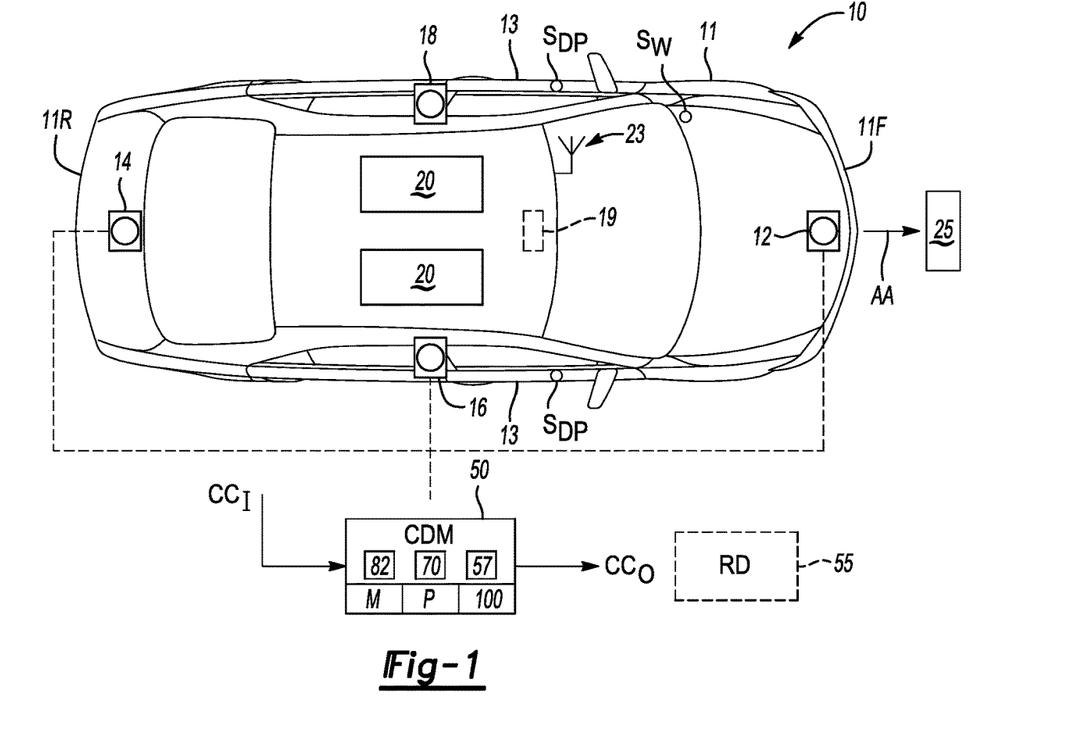
FIG. 1 is a schematic plan view illustration of an example vehicle having a camera diagnostic module (CDM) configured to diagnose health of individual camera-related subsystems as described herein.

Referring to the drawings, wherein like reference numbers refer to like components throughout the several views, a camera diagnostic module (CDM) 50 is shown in FIG. 1 as part of a system in the form of an example vehicle 10. Other system embodiments may be contemplated within the scope of the disclosure, including buildings or facilities, vehicles 10 other than motor vehicles, e.g., aircraft, trains, marine vessels, mobile platforms, and the like. For illustrative consistency, the vehicle 10 is described hereinafter equally within the context of operator-driven and autonomous vehicles 10, whether individually operated or operated as part of a fleet of similarly configured vehicles 10.

Figure 2:
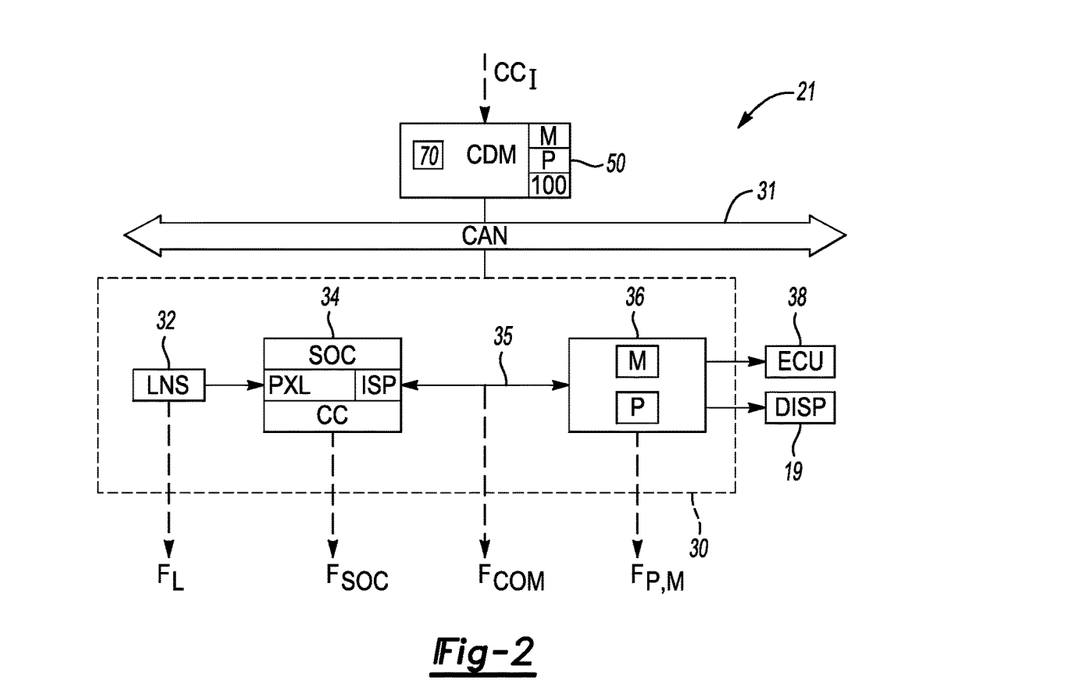
FIG. 2 is a schematic illustration of a digital camera network having the CDM of FIG. 1.

The vehicle 10 includes a digital network 21 as best shown in FIG. 2. Computer-readable instructions embodying a method 100 provide programmed functionality of the CDM 50, with an example embodiment of the method 100 depicted in FIG. 3. The disclosed health-related diagnostic and prognostic functions of the CDM 50 may be implemented onboard or offboard the vehicle 10 in different embodiments, with integrated sensor reports (arrow $CC_I$) containing potential fault indicators being communicated from various camera-related subsystems of the vehicle 10 to the CDM 50, potentially including additional sensor reports in the form of an open-door status from a door position sensor ($S_{DP}$) or rain, moisture, or other weather-related sensor values from a weather sensor ($S_W$), such as over a controller area network (CAN) bus, another communications bus or network, and/or via a telematics unit 23.

The CDM 50 may be remotely located with respect to the digital network 21, and configured to wirelessly receive the sensor reports (arrow $CC_I$) from the telematics unit 23. If the vehicle 10 includes sufficient amounts of onboard memory, the CDM 50 and the method 100 may be implemented onboard the vehicle 10 as a closed system. The physical location of the CDM 50 may therefore vary depending on the application.

Figure 5:
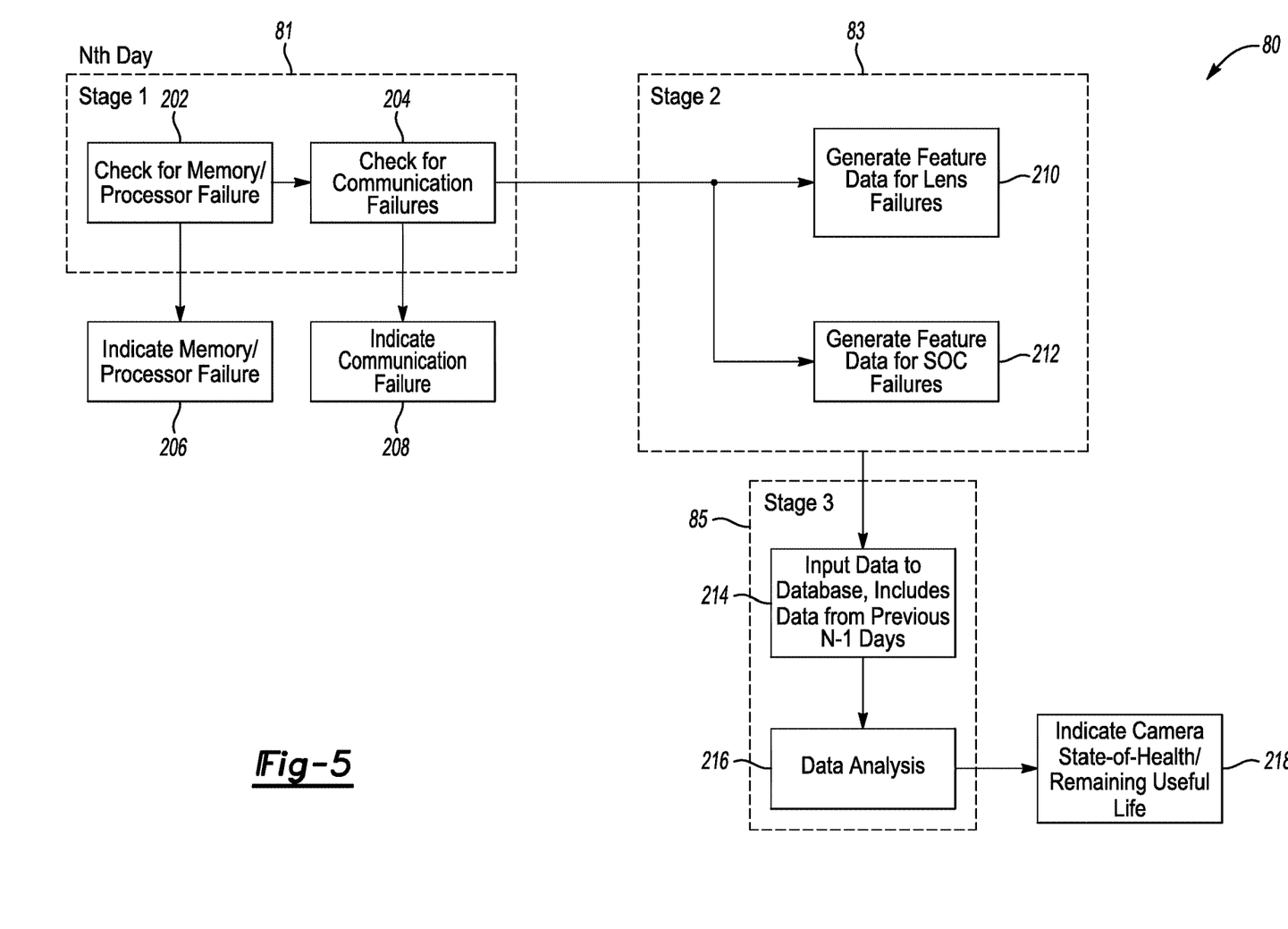
FIGS. 5 and 6 are flow charts describing example processes for fault prognosis/state of health prognosis of a camera network aboard an individual vehicle and a fleet of vehicles, respectively.
Figure 6:
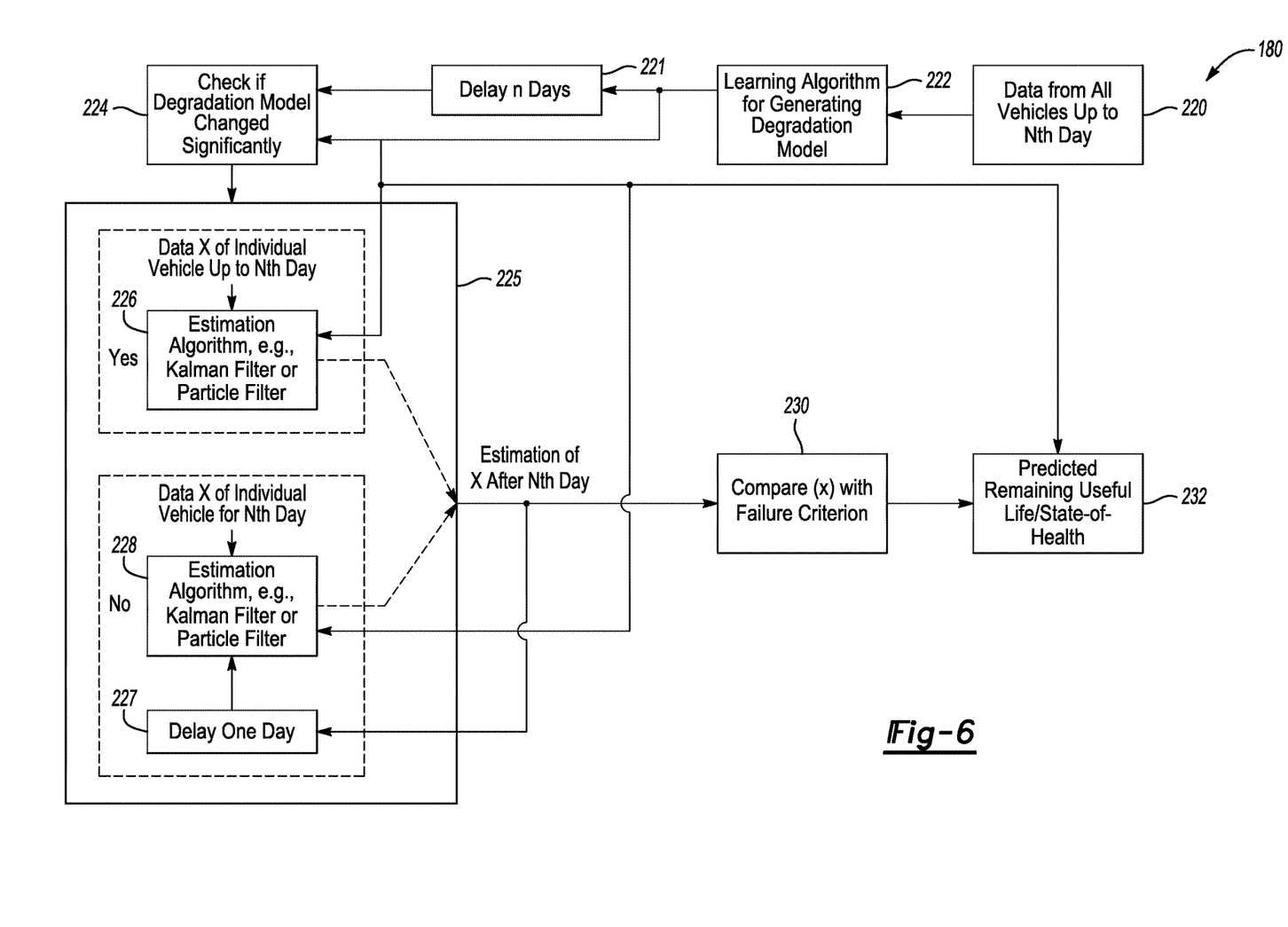

In general, the CDM 50 is configured to evaluate the performance of the digital network 21 at a subsystem-level of the digital network 21, doing so based on information in the integrated sensor reports (arrow $CC_I$) and data tables 70 of possible subsystem faults. Example data tables 70A-70D are shown in FIGS. 4A-4D, respectively, and explained in further detail below. Also set forth in further detail below is the optional use of reference images 25 to further isolate diagnosed subsystem faults, for instance by pinpointing a faulty component of a given subsystem, with camera-based imaging of the reference images 25 indicated schematically in FIG. 1 by arrow AA. The CDM 50 may also include a camera degradation model 82 trained using historical data of the vehicle 10 or a fleet of the vehicles 10, and which is ultimately used to determine the remaining useful life of the various cameras. FIGS. 5 and 6 depict optional forward-looking or prognostic functionality of the CDM 50, with the CDM 50 being operable as a standalone or a networked diagnostic tool, or as a standalone or networked combined diagnostic and prognostic tool.

Further with respect to the vehicle 10 shown in FIG. 1, the vehicle 10 includes a vehicle body 11 having a front body end 11F, a rear body end 11R, and doors 13, with the terms "front" and "rear" referring herein to the respective front/forward and rear/reverse driving directions of the vehicle 10, respectively. The vehicle 10 includes one or more digital cameras connected via the digital network 21 of FIG. 1, possibly including one or more of a forward-looking/front view camera 12, a rearward-looking/backup camera 14, a passenger-side view camera 16 and a driver-side view camera 18.

The digital cameras 12, 14, 16, and 18 are configured to receive energy in a designated band of the electromagnetic spectrum and convert the received energy to electrical signals in a digital pixel format. Structurally, the cameras 12, 14, 16, and 18 may be embodied as charge-coupled devices (CCD), complementary metal-oxide semiconductor (CMOS) sensors, or other types of cameras depending on the use, with data collected in the visible, infrared, or other desired frequency bands. Each of the cameras 12, 14, 16, and 18, generates one or more frames of pixel data at a calibrated frame rate, and are mounted to application-suitable structure of the vehicle 10, e.g., bumpers, body panels, facie, grills, mirrors, or door panels. Image data from the cameras 12, 14, 16, and 18 is then digitally processed using appropriate digital signal processing techniques, either within the cameras themselves or via a separate processor (not shown). Generated digital images are ultimately displayed to an operator on a display screen 19.

The CDM 50 receives the integrated sensor reports (arrow $CC_I$) as input data. Upon executing the method 100, the CDM 50 outputs a set of test results (arrow $CC_O$) based on a health characteristic of the evaluated camera, which in turn may trigger a suitable control action aboard the vehicle 10 and/or via a remote device (RD) 55, e.g., a server or external computer device. The CDM 50 is equipped with sufficient hardware to perform the required logical and control processes of the method 100, i.e., sufficient memory (M), a processor (P), and other hardware not shown for simplicity, such as a high-speed clock, analog-to-digital and/or digital-to-analog circuitry, a timer, input/output circuitry and associated devices, signal conditioning and/or signal buffering circuitry.

The memory (M) includes sufficient tangible, non-transitory memory such as magnetic or optical read-only memory, flash memory, etc., as well as random access memory, electrically erasable programmable read only memory, and the like. As described in further detail below with reference to FIG. 3, the memory (M) is populated with data tables 70 of correlations or relationships between reported data contained in the integrated sensor reports (arrow $CC_I$) and corresponding subsystem faults possibly indicated by the values of such data, e.g., relative to threshold ranges or other criteria. A database system (DBS) 57 may reside within the CDM 50 as shown, within the remote device 55 of FIG. 1, and/or another location accessible by the CDM 50 or remote device 55 as needed.

FIG. 2 depicts an embodiment of the digital network 21 that is usable as part of the vehicle 10 shown in FIG. 1 or as part of another system employing one or more cameras. As noted above, the CDM 50 receives the integrated sensor reports (arrow $CC_I$) from the cameras 12, 14, 16, and/or 18, as well as from other camera-related subsystems such as the weather sensor ($S_W$), the door position sensor ($S_{DP}$), etc. For each evaluated camera, the CDM 50 is in wired or wireless communication with a corresponding camera hardware suite 30 over a low-voltage differential network 31 such as the CAN bus as shown. The camera hardware suite 30 may include a lens (LNS) 32, camera hardware 34, and associated processing hardware 36. The camera hardware suite 30 may be in communication with an external electronic control unit (ECU) 38 and the display screen 19 of FIG. 1. Other subsystems not explicitly described herein may be contemplated within the scope of the disclosure, e.g., image sensors, temperature sensors, etc.

The lens 32 may be embodied as an optical lens, e.g., constructed of glass providing a function-appropriate aperture and focal length. The lens 32 may be opened and closed as needed in response to control signals from a separate control device (not shown) to admit or restrict/block light as needed in the collection of pixel images. The camera hardware 34 includes an image sensor system-on-chip (SOC), which includes the charge-coupled device (CCD), complementary metal-oxide semiconductor (CMOS), or other image sensor(s) configured to convert light/photons into corresponding electrical signals, as well as associated hardware performing the requisite digital signal processing of the electrical signals needed to output images in the form of sensor pixels (PXL). The image sensor SOC may include an image signal processor (ISP) and a resident control circuit (CC) collectively performing functions such as de-mosaicing, color detection, autofocus, white balance, exposure control, and other needed processes.

The camera hardware 34 of FIG. 2 is in communication with the associated processing hardware 36, which in turn may have resident memory (M) and a processor (P) apart from the memory (M) and processor (P) of the CDM 50. Digital pixel data is thus communicated from the camera hardware 34 to the associated processing hardware 36. Thereafter, the processing hardware 36 may perform one or more designated control functions, such as external object detection or pattern recognition, generation of graphical overlays such as parking or back-up trajectory lines, etc. The processing hardware 36 may be electrically connected to the display screen 19 and, possibly, to the external ECU 38. In such an embodiment, the external ECU 38 may control another designated function, such as but not limited to autonomous object avoidance control strategies such as braking and/or steering control or operator warning generation.

Signals are output from the various components of the camera hardware suite 30, with the output signals and signals from other sensors, e.g., door open/closed position sensors, rain/weather sensors, etc., collectively forming the integrated sensor reports (arrow $CC_I$). As a result of executing the method 100, the CDM 50 may ultimately output subsystem-specific fault reports as part of the test results (arrow $CC_O$) of FIG. 1. For instance, for the lens 32 the CDM 50 may output a lens failure report (arrow $F_L$) while for the camera hardware 34, the CDM 50 may output an image sensor system-on-chip failure report (arrow $F_{SOC}$). Likewise, a communications failure report (arrow $F_{COM}$) may be generated by the CDM 50 for a fault related to a communications bus such as a low-voltage differential signaling (LVDS) connection carrying the digital pixel data to the processing hardware 36. The communications bus 35, by way of non-limiting example, may be a two-wire differential signaling system transmitting information as a voltage difference between the wires. At the level of the processing hardware 36, other test results (arrow $CC_O$) may include processor or memory failures (arrow $F_{P,M}$). As will be described with reference to FIGS. 5 and 6 below, such test results (arrow $CC_O$) may be diagnostic and/or prognostic in nature, depending on the embodiment.

In executing the method 100, the CDM 50 includes accessing the data table(s) 70 of FIGS. 1 and 2 to perform the disclosed diagnostic and prognostic functions. For example, each of the data tables 70 may include a column listing the various subsystems of FIG. 2, such as "lens", "system-on-chip", "communications", and "processor/memory" corresponding to the lens 32, the camera hardware 34, the communications bus 35, and the processing hardware 36, respectively. A list of indicators corresponds to the camera-related subsystems, and to subsystems other than cameras that are potentially related to proper camera function such as door position and weather.

For example, the lens 32 may have characteristic fault indicators such as "dirty/water droplets", "out of focus", and "calibration" listed in a column. For the camera hardware 34, faults such as "strong/weak lighting" may be listed in the separate column, "cable failure" and "loose connection" for the communications bus 35, or "memory failure" for the controller 36. As part of the method 100, the CDM 50 may assess the health of the particular subsystem in the tables 70 without further isolating or identifying the failure beyond pinpointing the faulty subsystem.

Figure 3:
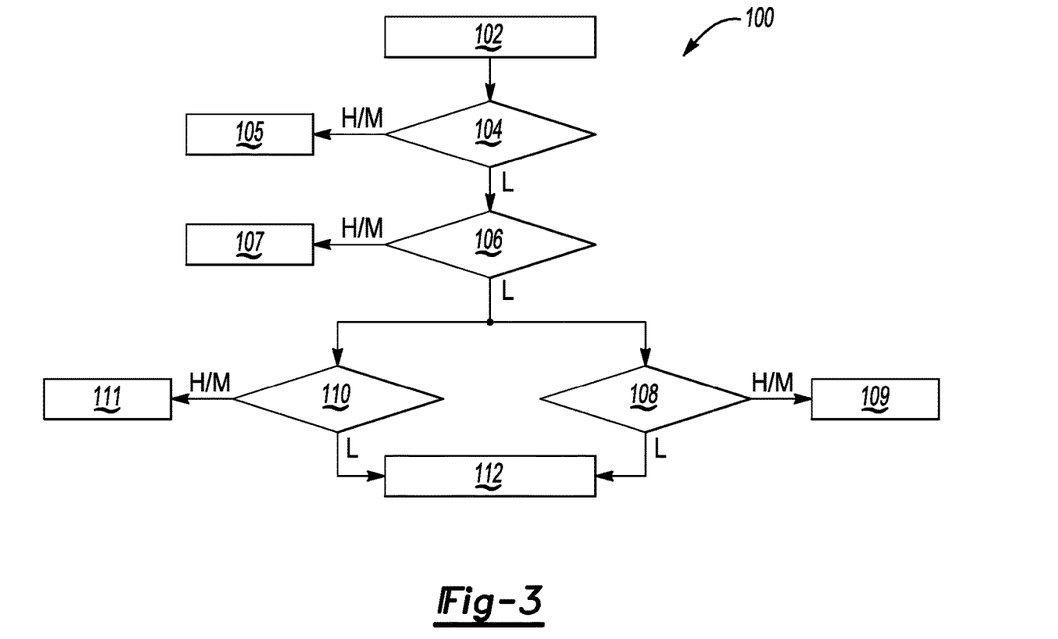
FIG. 3 is a flow chart describing an example embodiment of a method for diagnosing health of camera-related subsystems in the digital camera network of FIG. 2.

Referring to FIG. 3, an illustrative example embodiment of the method 100 commences at block 102 via operation of a given one of the cameras 12, 14, 16, or 18 with the collection of new data from the integrated sensor reports (arrow $CC_I$). Thus, block 102 includes receiving the integrated sensor reports (arrow $CC_I$), via the CDM 50, from the camera-related subsystems and possibly one or more other subsystems affecting camera performance before proceeding to block 104.

At block 104, the CDM 50 of FIG. 1 next evaluates the functionality of the cameras by evaluating the possibility of memory or processor-related failures, e.g., by determining a pattern of conditions in the collective sensor reports (arrow $CC_I$). Block 104 may progress by comparing the data in the received sensor reports (arrow $CC_I$) to a corresponding one of the data tables 70. Because the sensor reports (arrow $CC_I$) are transmitted to the processing hardware 36 via the communications bus 35 of FIG. 2, the CDM 50 evaluates the processing hardware 36 and the communications bus 35 first in a sequence. Block 105 is executed when the pattern of the potential fault indicators suggest or indicates that the possibility of a memory or processor failure is relatively high or medium, as indicated by "H/M" in FIG. 3, and to block 106 in the alternative when such a possibility is low ("L"). Differentiation between high and medium may be made in some embodiments, or one combined high-medium category, i.e., "high", may be used in a simplified embodiment.

Determination of high or low possibility of a given subsystem fault in block 105, as well as blocks 106, 108, and 110 as set forth below, may be understood with reference to the example data tables 70A-D of FIGS. 4A-D, respectively. For blocks 104, 106, 108, and 110 of the method 100, the CDM 50 may evaluate the possibility of failure as a function of patterns or combinations of certain conditions, e.g., combinations of sensor information (arrow $CC_I$), which in some embodiments may include determining the pattern of indicators that may be indicative of the faulty camera-related subsystem using a collective performance of multiple camera-related subsystems, e.g., from different vehicles 10 in a fleet.

Figure 4A:
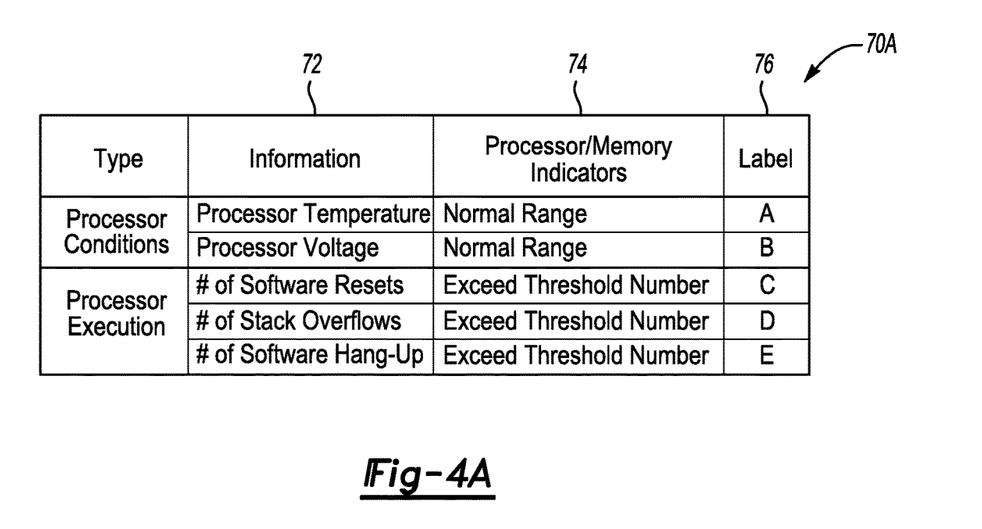
FIGS. 4A-4D are schematic depictions of example data tables usable as part of the vehicle embodiment shown in FIG. 1.

For instance, for possible faults of the processing hardware 36, a data table 70A as shown in FIG. 4A may be populated with sensor information 72 corresponding to data in the integrated sensor reports (arrow $CC_I$) of FIGS. 1 and 2, as well as associated fault indicators 74 and a corresponding characteristic identification label 76. As an example, the sensor information 72 may be in the form of processor temperature and voltage within a normal range, with the temperature and voltage respectively assigned the priority labels A and B. Processor execution tasks such as number of software resets, stack overflows, or hang-ups/time out events exceeding a threshold number may be assigned labels C, D, and E.

Failure possibilities may be broadly determined as a function of whether or not conditions corresponding to the indicator's labeled A, B, C, D, and E are satisfied. By way of an example illustration, if one or fewer of the indicators labeled as C, D, and E in FIG. 4A are satisfied, the failure possibility may be registered as "low". If two or three of the indicators labeled as C, D, and E are satisfied but the labels A and B are not satisfied, the failure possibility may be higher, with the highest possibility being registered when two or three of the indicators labeled as C, D, E are satisfied and one or more of labels A and B are also satisfied.

Figure 4B:
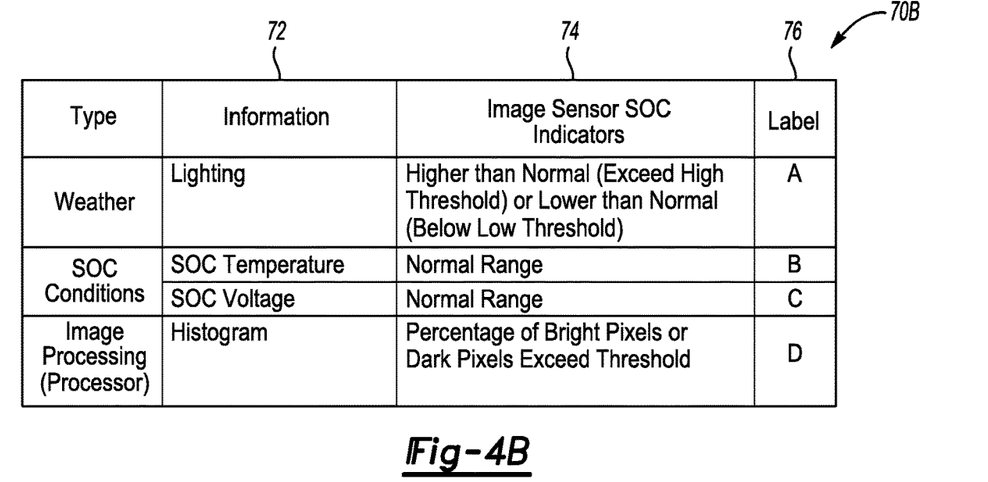
Figure 4C:
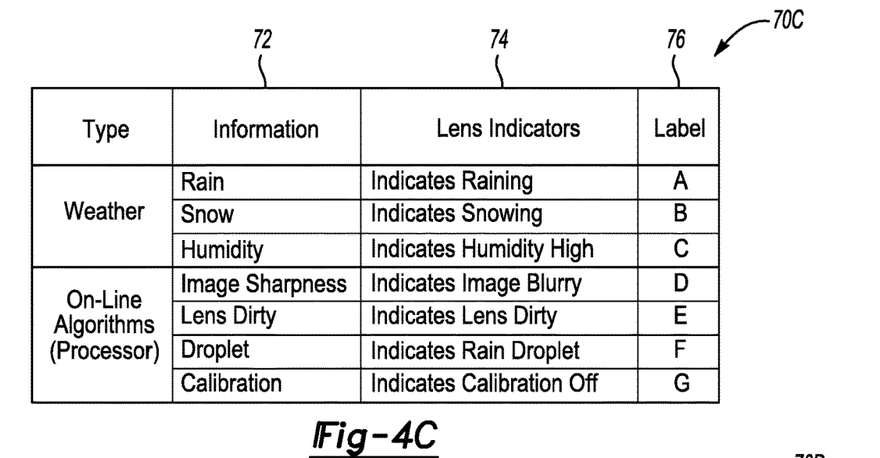
Figure 4D:
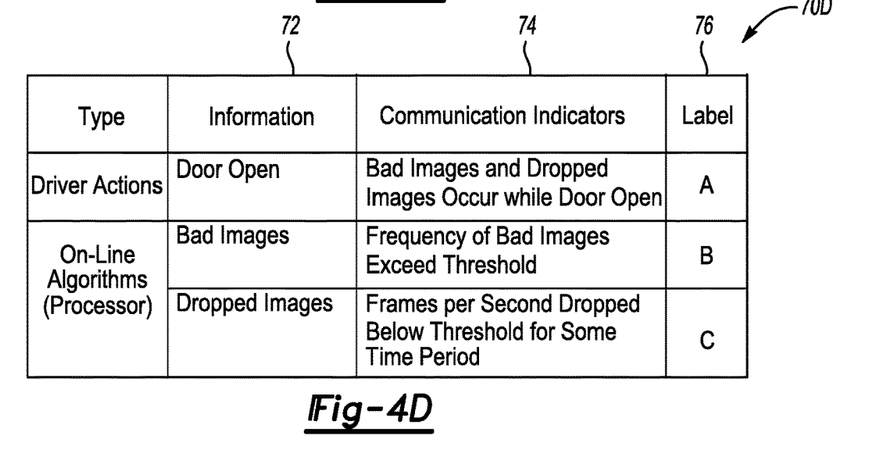

Similarly configured tables 70B, 70C, and 70D may be used for the various other subsystems as shown in FIGS. 4B, 4C, and 4D respectively. For instance, table 70B of FIG. 4B may be used for an image sensor system-on-chip (SOC) failure, with labels A, B, C, D, and E corresponding to a given fault indicator 74. With table 70B, a low possibility of failure may be indicated when the conditions of the indicators labeled as A and D are not satisfied, with higher probabilities returned otherwise, e.g., one of the indicators labeled as A or D is satisfied with both of the indicators labeled as B and C satisfied, or one of A and D being satisfied while at least one of B and C is not satisfied.

FIG. 4C corresponding to diagnosis of a lens failure includes indicators labeled as A-G and the corresponding sensor information 72 and fault indicators 74, with information in the latter present in or determined using the sensor reports (arrow $CC_I$). In such an embodiment, a low possibility of failure may be indicated when no more than one of D, E, F, and G are satisfied, with higher possibilities indicated when some of A, B, and/or C are satisfied or a plurality of D, E, F, and G are satisfied concurrently with one or more of A, B, and C. FIG. 4D and table 70D corresponds to communication failures, with low possibilities of failure returned when neither B nor C are satisfied, with higher probabilities returned when one or both of B and C are satisfied. In the execution of method 100, the CDM 50 may differentiate between low and high possibilities, or may use different criteria to determine increasing possibilities depending on the embodiment.

Referring again to FIG. 3, block 105 includes recording a diagnostic code in memory of the CDM 50 that is indicative of a likely memory or processor failure. Block 105 may also include recording information in a back office for further analysis or notification to an operator of the vehicle 10, e.g., via text message or e-mail. The method 100 thereafter commences with block 102 after a calibrated period, e.g., a subsequent on/off key cycle of the vehicle 10.

Block 106 includes checking for the possibility of communication failures by comparing the collected data to the tables 52. Block 107 is then executed when the possibility of communication failure is high, and to blocks 108 and 110 when the possibility is low.

Block 107 includes recording a diagnostic code in memory of the CDM 50 indicative of a likely communications failure. As with block 105, block 107 may also include recording information in a back office for further analysis or notification to an operator of the vehicle 10, e.g., via text message or e-mail. The method 100 thereafter commences with block 102 after a calibrated period, e.g., a subsequent on/off key cycle of the vehicle 10.

At block 108, the method 100 includes checking for the possibility of an image sensor system-on-chip (SOC) failure by comparing the collected data to the tables 52. Block 109 is then executed when the possibility of image sensor SOC failure is high, and to block 112 when the possibility is low.

Block 109 includes recording a diagnostic code in memory of the CDM 50 indicative of a likely image sensor SOC failure, and possibly recording the information in a back office location for further analysis or notification to an operator of the vehicle 10 as with block 105 and 107. The method 100 thereafter commences with block 102 after a calibrated period, e.g., a subsequent on/off key cycle of the vehicle 10.

At block 110, the method 100 includes checking for the possibility of a failure of the lens 32 by comparing the collected data to the tables 52. Block 111 is then executed when the possibility of lens failure is high, and to block 112 when the possibility is low.

Block 112 is reached when a decision is made at blocks 108 and 110 that the possibility of image sensor SOC failure and a lens failure is low for both subsystems. If both inputs exist and the possibility is low, the method 100 includes recording a diagnostic code in memory of the DTC 50 that is indicative of a normally-functioning camera. The method 100 thereafter commences with block 102 after a calibrated period, e.g., a subsequent on/off key cycle of the vehicle 10. Block 112 may also include recording information in a back office for further analysis or notification to an operator of the vehicle 10, e.g., via text message or e-mail. Such passing results may be used as historical reference data in future iterations of the method 100 to help pinpoint when a given camera is functioning properly or not, or to help update an aging or degradation model for state of health/remaining useful life predictions.

As noted above, diagnostic performance of the CDM 50 may be limited to identifying a potentially faulty subsystem within the digital camera network 21 of FIG. 2 without further isolating the fault. By way of example, method 100 may end with the diagnosis of a potentially faulty lens 32, and with the control action of recording a bit flag indicative of the faulty lens 32.

In some embodiments, it may be advantageous to further isolate the fault. One example is the further isolation of a fault of the lens 32 of FIG. 2. The method 100 may be expanded to pinpoint a dirty or wet lens 32 or a lens 32 that is out of focus lens or improperly calibrated, either of which may require different corrective actions. One way to achieve fault isolation is by presentation of the set of images 25 shown in FIG. 1 to a given one of the cameras 12, 14, 16, or 18, i.e., the particular camera having a diagnosed faulty subsystem. In such an embodiment, the faulty camera, such as the camera 12, takes digital pictures or video of the presented set of images 25 as a set of pixel images, as indicated by arrow AA in FIG. 1. The CDM 50 may thereafter generate a value that is representative of a quality of the collected pixel images relative to the calibrated set of images 25. The calculated feature may be a modular transfer function (MTF) value in some embodiments, e.g., as a value representative of sharpness and focus of the lens 32 shown in FIG. 2. As a calibrated/new camera has an expected performance when imaging the baseline set of images 25, variation of the camera's actual performance when collecting the pixel images (arrow AA) with respect to the camera's expected performance may be quantified and used to evaluate the state of health of the camera.

Such diagnosis and prognosis may be performed on a single vehicle 10 or across a fleet of similar configured vehicles 10 in different embodiments, for both operator driven and autonomously operated vehicle embodiments. For a single vehicle 10, a camera diagnosed as potentially faulty may be tested against the set of images 25 of calibrated sharpness and focus, with the output of the camera quantified and compared to the expected output. Further evaluation may be performed, for instance, when the vehicle 10 is in a service facility undergoing maintenance, or when the vehicle 10 is returned to a depot at the end of a driving shift in the case of an autonomous vehicle 10. Fault thresholds may be applied in the single vehicle 10 embodiment, e.g., based on a failure model or historic data. The CDM 50 can thereafter determine whether a fault is occurring, detect a specific fault as well as its associated severity, based on such threshold comparisons.

For a fleet of vehicles 10, the camera output from a plurality of cameras having the same construction, e.g., a plurality of cameras 12, may be communicated to the database system 57 of FIG. 1. The database may reside within the CDM 50 as shown, and/or the remote device 55 of FIG. 1. From the collective data, the CDM 50 or remote device 55 may determine which cameras of different vehicles 10 are statistical outliers relative to the other vehicles 10 in the fleet. In this manner, access to a greater amount of comparative data is made available. In such an embodiment, the CDM 50 may make use of a histogram or other statistical processes to determine whether a fault has occurred for a given vehicle 10, and how far from a mean of data from a particular vehicle 10 has deviated, thus indicating the severity of the fault. Such an approach may use a pre-established relationship between the distance from the data mean and the severity of the fault. Thus, use of data from a fleet of similar vehicles 10 may be used in conjunction with or in lieu of the images 25 to help identify and isolate the faults based on detection of outlier data.

Camera Prognostics

Another potential benefit of utilizing data from a fleet of vehicles 10 is the ability to look ahead in time and thus provide a more accurate prognosis of the health characteristic noted above, e.g., the remaining useful life of given one of the cameras 12, 14, 16, or 18 and/or a related subsystem thereof. In general, if for a single vehicle 10 the CDM 50 has access to a time-history of a given indicator, e.g., a state of health trajectory or a mean transfer function (MTF) value processed through and used to train the camera degradation model 82 of FIG. 1, the CDM 50 is able to use the camera degradation model 82 to estimate the remaining useful life of the camera, i.e., a time remaining until the particular indicator increases or decreases above/below a calibrated threshold. For a fleet of the vehicles 10, time histories of the given indicator can train the camera degradation model 82 in a similar manner, with the greater amount of historical data improving the overall predictive accuracy of the model 82.

In some embodiments, a numeric state of health (SOH) may be developed as or using indicators from a single vehicle 10, or as/using indicators from a fleet of such vehicles 10. Such a fleet could have vehicles 10 that are driven at different times with cameras 12, 14, 16, 18 of various ages and SOH. Thus, data fed into the above-noted database includes data from the first N−1 days and data up to the $N^{th}$ day from the various vehicles 10. As a result, the CDM 50 may predict a future failure for a given vehicle 10 based on the progression of decay of the SOH of each camera in the fleet.

That is, knowing that a given one of the cameras, e.g., the camera 12, exhibits an SOH of 1 when new, an SOH of 0.8 on day N, an SOH of 0.7 on day N+1, and an SOH of 0.4 on day N+2, etc., the average trajectory of decay of SOH may be determined for the fleet as a whole, e.g., using the camera degradation model 75 and considering the corresponding SOH or other suitable indicator of performance or health from each of the vehicles 10 in the fleet. A Kalman filter or other estimation algorithm may be applied to provide an estimate of a given indicator, e.g., the SOH, after the $N^{th}$ day of use for a given camera 12. Then, for a given vehicle 10 having a similar camera 12, 14, 16, or 18 with a calculated SOH or other suitable indicator, the CDM 50 may predict the remaining useful life of the camera or the SOH at future time points, and thereby proactively warn the owner/operator of the vehicle 10 and/or schedule maintenance of the camera 12 before the camera fails.

FIGS. 5 and 6 describe schematic data flow for possible forward-looking prognostic implementations of the method 100 for an individual vehicle 10 and a fleet of such vehicles 10, respectively. A flow diagram 80 of FIG. 5 is arranged in three stages, i.e., Stage 1 corresponding to block grouping 81, Stage 2 corresponding to block grouping 83, and Stage 3 corresponding to block grouping 85.

Stage 1 includes blocks 202 and 204, wherein on the $N^{th}$ day of operation of the vehicle 10, the CDM 50 may check for a failure in the memory/processor of the digital network 21 and communications failures, analogously to blocks 104 and 106 of FIG. 3. However, blocks 202 and block 204 may include measuring a set of indicators of the digital network 21 while capturing pixel images of the images 25 using the digital camera 12, 14, 16, or 18 having the camera-related subsystem that is being evaluated. This may include presenting the images 25 to the camera, collecting the sensor reports (arrow $CC_I$), and then comparing the measured indicators as calibrated baseline indicators (i.e., actual performance) of the memory/processor and communications network to an expected performance for each subsystem, i.e., a performance expected of a calibrated/new camera when imaging the images 25. Block 202 proceeds to block 204 when a fault is not detected at block 202, and to block 206 when such a fault is detected at block 202. Likewise, block 204 proceeds to block 210 when a fault is not detected at block 204, and to block 208 when such a fault is detected at block 204.

Blocks 206 and 208 include recording a diagnostic code indicative of a memory/processor fault (block 206) and a communications failure (block 208), in the manner described above with reference to blocks 105 and 107. The algorithm does not continue if faults are registered at either of blocks 206 or 208.

Stage 2 commences at block 210 after Stage 1 evaluation is complete. Blocks 210 and 212 of Stage 2 simultaneously evaluate the lens 32 and image sensor SOC as described above with reference to blocks 110 and 108 of FIG. 3, respectively. The images 25 may be used in Stage 2 to generate a controlled set of sensor reports (arrow $CC_I$), which as noted above can be compared to calibrated reference data/expected data to evaluate performance of the subsystem. The CDM 50 may determine a difference or variance between the present value of the indicator and the corresponding value, and then proceeds to block 218.

Block 218 includes indicating the state of health (SOH) of the camera and/or the remaining useful life of the camera as a health characteristic of the evaluated camera or camera-related subsystem. Possible ways of accomplishing block 218 include recording the SOH or remaining useful life in memory of the CDM 50, or generating a text message or e-email message to an operator of the vehicle 10 informing the operator as to the SOH or remaining useful life, thereby affording the owner/operator sufficient time to schedule preemptive maintenance.

FIG. 6 illustrates via a flow diagram 180 of a possible forward-looking prognostic implementation of the method 100 for a fleet of vehicles 10. Beginning with block 220, the CDM 50 may receive camera sensor reports (arrow $CC_I$) from the vehicles 10 up to the $N^{th}$ day of operation before proceeding to block 222. Each vehicle 10 in the fleet, and thus the cameras 12, 14, 16, and 18, may have a different age, and therefore the data at block 220 will vary.

Block 222 may include applying a learning algorithm or other approach to the data from block 220 to thereby generate the camera degradation model 75 shown in FIG. 1. Block 222 thereafter proceeds to blocks 221, 224, and 226.

At block 221, the CDM 50 may delay updating the camera degradation module 75 for (n) days before proceeding to block 224, such that an earlier version of the camera degradation model 75 is available at block 224. The actual number of days (n) may vary with the intended application.

Block 224 includes determining if the degradation model 75 has changed significantly over the (n) days of delay from block 221, i.e., by comparing the delayed model from block 221 to the model from block 222. Estimation block grouping 225 is then entered, with block 226 executed if there has been a significant change, and with block 228 is executed if there has not been a significant change.

Block 226 receives the data or indicator being considered, indicated as X in FIG. 6, for the individual camera of vehicles 10 for which prognosis is being performed, up to the $N^{th}$ day of performance. Block 226 may include applying a suitable estimation algorithm e.g., a Kalman filter or a particle filter, to thereby estimate the value of X after the $N^{th}$ day for a given vehicle 10. Once the estimate of the indicator (X) has been generated, the CDM 50 proceeds to block 230.

Block 228 is similar to block 226, with the exception of block 228 using the value of the indicator (X) for the $N^{th}$ day of operation, while block 226 considers data up to the $N^{th}$ day. Input data to block 228 is in the form of a delayed estimate of the indicator (X). That is, the output of block 226 or 228, i.e., the estimation of the value of the indicator (X) after the $N^{th}$ day of performance, is delayed at block 227 for one day. Thus, block 228 considers delayed information in providing its estimation. Regardless of whether the estimation of the value of the indicator (X) is provided by blocks 226 or 228, the estimation is thereafter fed into block 230.

At block 230 the CDM 50 compares the estimate of indicator (X) to a criterion for failure. For instance, assuming the failure criterion is "SOH=≤0.2" and an estimation from blocks 226 or 228 of "SOH=0.35", the CDM 50 may calculate that the failure criterion threshold remains 0.15 below the present SOH.

Thereafter, at block 232 the CDM 50 estimates the health characteristic in the form of the remaining useful life of the particular camera being evaluated. For example, the CDM 50 may use the camera degradation model 75 to predict, from the past history of the fleet of vehicles 10, how long it will take for the SOH to degrade from 0.35 to 0.2 in the above example. Such an estimate may thereafter be presented to the owner or operator of the particular vehicle 10 whose camera has the indicated SOH, such as via a text message or email, along or concurrently with recordation of a corresponding diagnostic code, e.g., in memory of the CDM 50.

Using the method 100 described above with reference to FIGS. 1-6, the vehicles 10 and other systems may enjoy early and more reliable detection, diagnosis, and prognosis of camera faults. For autonomous vehicle fleets, execution of the method 100 across the entire fleet prior to performing assigned driving missions may facilitate detection of camera sensor failures and provide useful health assessments. Forward-looking prognosis may be implemented using the approaches of FIGS. 5 and 6 to proactively handle evolving faults.

The method 100 may be implemented onboard or offboard the vehicle 10 or other system, and thus provides a great deal of flexibility for different implementations, ranging from onboard implementations for a single vehicle 10 to large offboard implementations assisted by vehicle telematics communication. Similarly, telematics communication may facilitate larger ranges of comparative data even with single vehicle 10 implementations, such as by periodically downloading fleet-wide mean data to the vehicle 10 for improved average comparisons. These and other benefits will be readily appreciated by one of ordinary skill in the art in view of the above description.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method for evaluating performance of a camera-related subsystem of a digital camera within a digital network, the method comprising:
    receiving, via a camera diagnostic module (CDM), a set of sensor reports from a plurality of sensors within the digital network, the CDM having memory within which is recorded a plurality of data tables correlating data-type sensor information with associated fault indicator threshold values, ranges, and/or criteria corresponding to subsystem-specific fault modes;
    comparing multiple potential fault indicators contained in the received sensor reports to the fault indicator threshold values, ranges, and/or criteria contained in a corresponding one of the data tables associated with the camera-related subsystem;
    determining whether there is a failure in the camera-related subsystem by evaluating a pattern of the potential fault indicators in the received sensor reports satisfying the respective fault indicator threshold values, ranges, and/or criteria contained in the corresponding one of the data tables, the pattern being indicative of the failure in the camera-related subsystem when a predetermined combination of the potential fault indicators satisfies the respective fault indicator threshold values, ranges, and/or criteria; and
    executing a control action with respect to the digital network in response to the failure in the camera-related subsystem, the control action including recording a code via the CDM that is indicative of the failure.

2. The method of claim 1, wherein the camera-related subsystem of the digital camera includes a plurality of camera-related subsystems, the plurality of camera-related subsystems including a lens, an image sensor system-on-chip, a communication bus, and processing hardware, and wherein receiving the set of sensor reports includes receiving a corresponding sensor report for each of the camera-related subsystems.

3. The method of claim 1, wherein the digital network is onboard a vehicle having a vehicle door, and the plurality of sensors includes a door position sensor and a weather sensor, and wherein receiving the set of sensor reports includes receiving a door open/closed state from the door position sensor and a rain/moisture value from the weather sensor.

4. The method of claim 1, wherein the digital camera includes a plurality of digital cameras comprised of a backup camera and a forward-looking camera.

5. The method of claim 1, wherein the camera-related subsystem includes a plurality of camera-related subsystems, the method further comprising:
    generating new potential fault indicators via the CDM while capturing pixel images of calibrated images using the digital camera having the diagnosed faulty camera-related subsystem;
    comparing the new potential fault indicators to calibrated values for a calibrated/new digital camera; and
    isolating the faulty camera-related subsystem from the plurality of camera-related subsystems based on a variance between the potential fault indicators and the calibrated values.

6. The method of claim 1, wherein executing the control action further includes:
    determining a remaining useful life of the digital camera using a camera degradation model; and
    transmitting a message containing the remaining useful life to an owner or operator of the digital network.

7. The method of claim 6, wherein determining the remaining useful life includes processing a modular transfer function value or a numeric state of health through the camera degradation model.

8. The method of claim 6, wherein the CDM is used aboard a vehicle as part of a fleet of vehicles each having a corresponding plurality of the digital cameras, the method further comprising training the camera degradation model using historical data from all of the digital cameras in the fleet of vehicles.

9. The method of claim 6, wherein the CDM is part of a single vehicle having the digital camera, the method further comprising training the camera degradation model using historical data from the digital camera of the single vehicle.

10. The method of claim 1, wherein the CDM is remotely located with respect to the digital network, the method further comprising transmitting the integrated sensor reports to the CDM using a telematics unit.

11. The method of claim 1, wherein the pattern is indicative of:
    a low possibility of failure in the camera-related subsystem when a first predetermined combination of the potential fault indicators do and do not satisfy the respective fault indicator threshold values and/or ranges stored in the data tables; and
    a high possibility of failure in the camera-related subsystem when a first predetermined combination of the potential fault indicators do and do not satisfy the respective fault indicator threshold values and/or ranges stored in the data tables, wherein executing the control action is in response to the pattern indicating the high possibility of failure.

\* \* \* \* \*